H. M. SEAGERS AND S. H. DRAKE.
STAND.
APPLICATION FILED MAR. 27, 1916. RENEWED DEC. 31, 1918.
1,311,918. Patented Aug. 5, 1919.
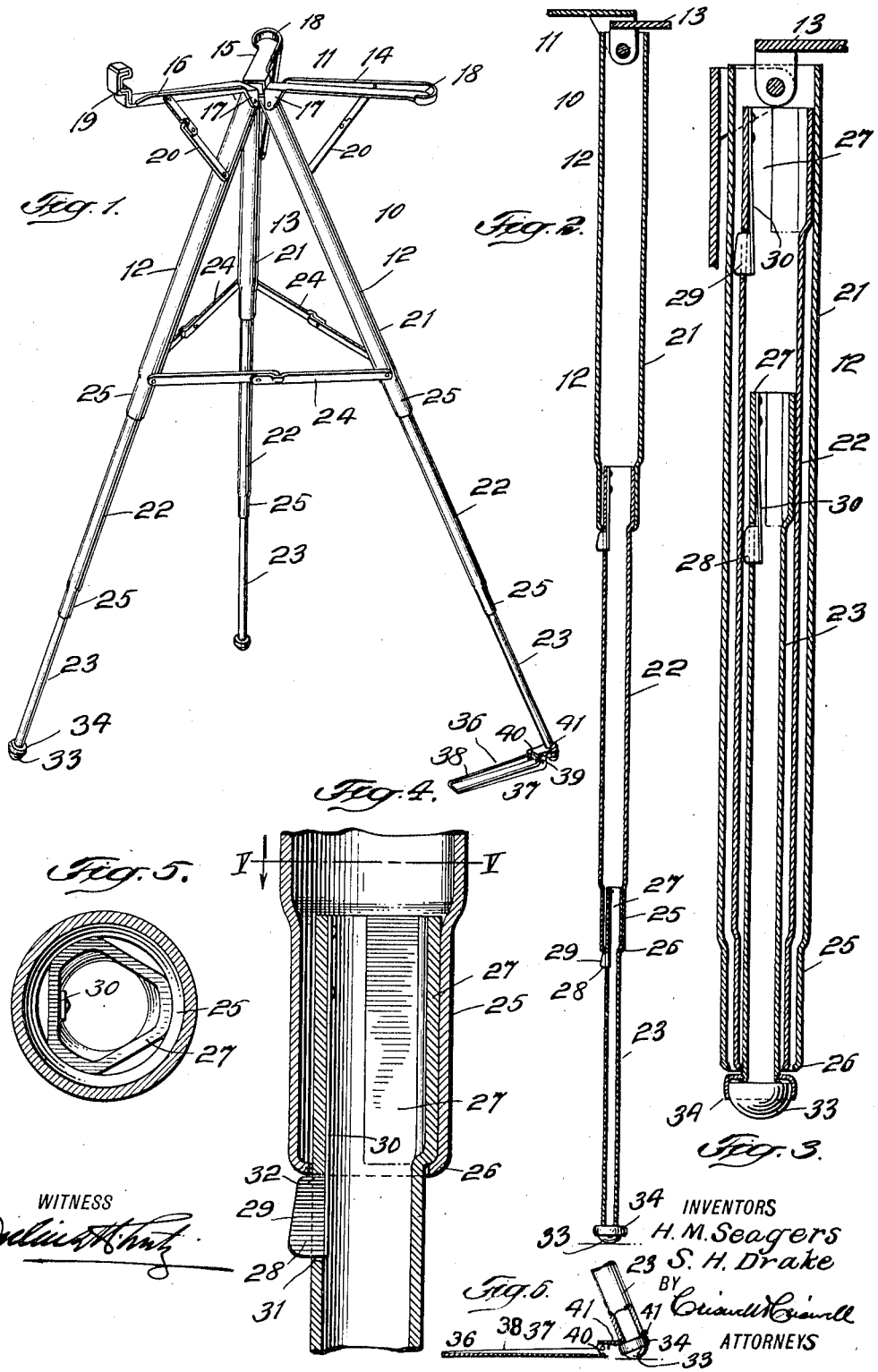

UNITED STATES PATENT OFFICE.

HARRY M. SEAGERS AND SAMUEL H. DRAKE, OF GROTON, NEW YORK, ASSIGNORS TO CORONA TYPEWRITER COMPANY, INC., A CORPORATION OF NEW YORK.

STAND.

1,311,918.  Specification of Letters Patent.  Patented Aug. 5, 1919.

Application filed March 27, 1916, Serial No. 87,021. Renewed December 31, 1918. Serial No. 269,174.

*To all whom it may concern:*

Be it known that we, HARRY M. SEAGERS and SAMUEL H. DRAKE, citizens of the United States, residing at Groton, county of Tompkins, and State of New York, have invented certain new and useful Improvements in Stands, of which the following is a full, clear, and exact description.

This invention relates more particularly to foldable or collapsible stands adapted to support small portable typewriting machines.

In the stand invented by Carleton W. Smith, No. 1,173,051, dated Feb. 22, 1916, which is particularly adapted for the small portable Corona typewriter, the members forming the extensible or telescopic legs fit neatly one within the other with the result that the nickel plating or finished surface of the leg members when telescoped and while being extended come in close contact with a scraping or abrading effect, thus injuriously affecting the appearance of the stand while in use. In such construction also the telescoping leg members by having a sliding contact throughout their entire length are more liable to stick or prevent easy extension or collapsing if fitted to sustain the weight of a machine than would be the case if such contact surfaces did not exist.

One of the principal objects of the invention is to provide a stand having legs of such construction that the members when extended will be rigidly and properly held to support a typewriter and which will permit the members forming the legs of the stand to be readily extended or telescoped without causing one member and particularly that part ordinarily exposed when extended to have a rubbing frictional contact with another member, thus permitting the members to be nickel-plated or finished in any desired way without liability of the finishing surface being destroyed by abrasion after short used.

Another object of the invention is to provide a simple and efficient joint for the legs of the stand which will give sufficient bearing surface between the members when extended and to provide means whereby the leg members may be held against telescopic movement.

A further object of the invention is to provide simple means whereby the stand may be braced by the foot of the operator.

A still further object of the invention is to provide simple and efficient means whereby rubber tipped feet may be held to the lowermost leg members.

With these and other objects in view, the invention will be hereinafter more particularly described with reference to the accompanying drawings, which form a part of this application, and will then be pointed out in the claims at the end of the description.

In the drawings, Figure 1 is a perspective view of one form of stand embodying the invention.

Fig. 2 is a vertical section through one of the legs showing the members in an extended position.

Fig. 3 is an enlarged sectional view showing the leg members in a telescoped condition.

Fig. 4 is an enlarged vertical section of the joint when the leg members are extended.

Fig. 5 is a sectional plan taken on the line V—V of Fig. 4; and

Fig. 6 is a section showing the construction and manner of holding a foot brace on one of the typewriter leg members.

The stand 10 has a table or top 11 and telescopic or extensible legs 12 all joined together, a bracket or cap piece 13 being provided for this purpose. The table 11 comprises three arms or members, 14, 15 and 16. These members are radially arranged and pivotally held to the legs by lugs 17 located at the inner ends of said members. The members or arms 14 and 15 at their outer ends are provided with flanged parts 18 to receive the rubber tips at the rear of the typewriting machine frame, while the member 16 has a hook portion 19 adapted to pass over the front transversely extending bar of the frame of the machine, thus rigidly holding the typewriter in an operative position. The arms or members 14, 15 and 16 are radially arranged being pivotally held to the legs and are adapted to fold downward when collapsing the stand, and to hold said arms or members in an upright position are two-part braces 20 which are pivoted together and provided with a break joint so that in one position they will rigidly support the arms or members in a horizontal position but by breaking the joint said arms may be folded downward along the legs 13, there being an arm for each leg. The legs 13 each comprise three members 21, 22 and 23, but the number of said members may vary. The lower portion of the leg members 21 are connected together by two-part braces which are held to the leg members and to each other and form a break joint to fold upward in order that the legs may be moved into close compact relation. The parts as thus described are substantially the same as that disclosed in the patent herein referred to and may be of any desired construction.

Each of the leg members 21 and 22 are reduced in diameter as at 25. The member 22 of each leg is adapted to move into the leg member 21 and the member 23 is adapted to move into the leg member 22 when the stand is collapsed in order that the length of the stand may be very materially reduced as shown best in Fig. 3. The reduced portion 25 of the members 21 and 22 provide a bearing surface when the leg members are extended. The leg members are tubular in form and may be cylindrical in cross section and have an inturned or limiting end 26 at the lower portion of the reduced part 25. The end 26 has an opening or passage somewhat larger than the diameter of the body of the member which moves into the member having said end, and both the members 22 and 23 have an enlarged rigid part 27 which fits neatly into the reduced part 25. The enlarged part 27 of the leg members may be substantially triangular in form when viewed in cross section as shown in Fig. 5 and provides three contact bearing surfaces instead of a continuous cylindrical bearing and by reason of the length of the reduced part 25 and the enlarged part 27 a substantial and extended bearing is provided for the leg members which will sustain the leg members properly while in an extended position. As soon as the part 27 of one member is forced far enough to enter the enlarged part of its coöperating leg member, the leg member on which the part 27 is formed will then be free to move inwardly and because the diameter of the body of the inwardly moving member is much smaller than the diameter of the inclosing member the nickel or otherwise plated or finished surface will not be subject to abrasion or injury either during the telescoping or the extension of the leg members.

The leg members in their extended positions may be held against relative movement except when released by means of a catch as 28. The catch 28 is formed as a finger part 29 and a spring or yielding part 30. The catch 28 is held to the enlarged part 27 of the inner member, and the part 28 is adapted to pass through a slot, as 31, in the reduced portion of said member so that said catch may provide a locking shoulder, as 32, to prevent the collapsing or telescoping of the members until the catch 28 has been forced inward to release the inner member from engagement with the inturned part or end 26 of the inclosing leg member. The springs 30 may be of such tension as will cause the enlarged ends 27 to be forced at one part thereof against the inner surface of the inclosing leg members causing a frictional engagement between said enlarged ends and finger parts 29 of the catches 28 and the inner surface of said inclosing leg members. This will hold the leg members in place when telescoped and without causing a rubbing action between any finished surface that might be exposed when the legs are extended.

The lower leg members 23 may each be provided with a rubber tip as 33. This tip forms a foot and is held to a cup portion 34 which is held to the lower end of said member 23 as by a groove and beaded end; though other means than the rubber tip may be provided if desired.

A rest as 36 may be arranged at the lower portion of one of the legs to adapt the operator to rest his foot in order to assist in bracing the stand while operating the typewriter. As shown the brace comprises a part or member 37 of a plate-like form having upwardly extending flanges 38 provided with lugs 39 which are pivotally held to lugs or lips 40 on a bracket 41. The bracket 41 is adapted to fit about one of the leg members 33 and when in use may be made to assume the position shown in Fig. 1, and when not in use may be folded upwardly alongside of one of the legs in order that the stand may be collapsed properly when not in use.

It will be understood that the inclosing leg member of each leg may have the body thereof the same diameter except as to the enlarged part at one end thus avoiding the necessity of a reduced end portion in which case the enlarged end of the inwardly moving member will contact with the inner surface of the inclosing leg member throughout their entire relative movements, or the outer end of the enlarged part or its entire length may be slotted to provide yielding contact portions if desired. It will be further understood that locking or engaging means may be provided to hold the leg members in their collapsed or telescoped position as well as in their extended position.

From the foregoing it will be evident that simple and efficient means is provided whereby the legs may be held in a substantially rigid manner and still permit the legs to be extended or telescoped very easily and without injury to the finished surface of the leg members; and that simple means is provided as a brace and supporting means for the leg members.

Having thus described our invention, we claim as new and desire to secure by Letters Patent:—

1. A telescopic leg for a collapsible stand, comprising a cylindrical upper member having an elongated cylindrical reduced bearing portion at its lower end of uniform diameter provided with an inwardly extending limiting flange, a cylindrical lower member adapted to telescope within the upper member and having portions of the upper end thereof projecting outwardly to form vertically elongated spaced bearing faces adapted to engage the inner surface of the reduced bearing portion of the upper member at circumferentially spaced points and to abut against the limiting flange when the members are extended, and means for locking the members in extended position.

2. A stand having a plurality of telescopic legs each comprising a plurality of members, certain of said members having elongated cylindrical reduced portions at their lower ends, and certain others having elongated enlarged portions at their upper ends provided with three spaced and extended bearing surfaces adapted to fit within said reduced portions in adjacent members when the members are in extended position, and spring-pressed latches held to one side of the enlarged portions of the members adapted to engage the reduced portions of adjacent members to lock the members in extended position, said latches being also adapted to engage the interior of adjacent members when the members are telescoped and force one of said spaced bearing surfaces of each of said enlarged portions into frictional engagement with the interior of the adjacent member.

3. A stand provided with a plurality of telescopic legs having upper sections formed at their lower ends with elongated cylindrical reduced portions of uniform diameter throughout the length of said portions, and lower sections adapted to telescope within the upper sections and each having the upper end thereof provided with outwardly projecting portions forming elongated rounded bearing faces extending vertically and spaced apart circumferentially of the section, the spaced bearing faces of each lower section being adapted to engage the inner surface of the reduced portion of its associated upper section when the sections are extended.

4. A telescopic leg for collapsible stands, comprising a tubular member having an elongated reduced portion at its lower end of uniform diameter throughout the length of said portion, a second member adapted to telescope within said tubular member and provided at its upper end with outwardly projecting vertically elongated portions spaced apart circumferentially of the member to form bearing faces adapted to engage the inner surface of the reduced lower end portion of the tubular member along vertically extending circumferentially spaced lines when the members are extended, and yieldable means carried by said second member for locking the members in extended position and adapted to engage the inner surface of the tubular member when the members are telescoped to cause one of the bearing faces on the second member to frictionally engage the inner surface of the tubular member.

5. A telescopic leg for a folding stand comprising a tubular member having an elongated reduced bearing portion at its lower end, a second tubular member having an enlarged elongated bearing portion at its upper end adapted to fit within the reduced bearing portion of the other member when said members are extended, means for limiting the extending movement of said members, and a spring-pressed latch carried by the second member adapted to engage the other member to positively lock the members in extended position, said latch being also adapted to engage the inner side of the other member when the second member is telescoped within the same and force one side of the enlarged bearing portion of the second member laterally into frictional engagement with said other member, whereby said members are frictionally held in telescoped position.

6. A telescopic leg for foldable stands comprising three sections adapted to be moved into telescopic relation or to be extended, one of said members having a reduced portion at its lower end, a second member having an enlarged substantially triangular portion at its upper end adapted to fit within said reduced portion when said members are extended, said second member also being provided with a reduced portion at its lower end, and a third member having an enlarged substantially triangular portion at its upper end adapted to fit within the reduced portion of the second member when in an extended position.

This specification signed this 18th day of March, A. D. 1916.

HARRY M. SEAGERS.
SAMUEL H. DRAKE.